United States Patent
Sundaravel Damotharan et al.

(10) Patent No.: US 12,044,155 B2
(45) Date of Patent: Jul. 23, 2024

(54) SYSTEMS AND METHODS FOR DIAGNOSING NOx SENSOR BASED ON AMMONIA SLIP

(71) Applicant: Cummins Inc., Columbus, IN (US)

(72) Inventors: Arun Shori Sundaravel Damotharan, Columbus, IN (US); Sergio M. Hernandez-Gonzalez, Greenwood, IN (US); Joshua Edward Supplee, Plain City, OH (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/928,138

(22) PCT Filed: May 27, 2021

(86) PCT No.: PCT/US2021/034523
§ 371 (c)(1),
(2) Date: Nov. 28, 2022

(87) PCT Pub. No.: WO2021/243025
PCT Pub. Date: Dec. 2, 2021

(65) Prior Publication Data
US 2023/0220794 A1     Jul. 13, 2023

Related U.S. Application Data

(60) Provisional application No. 63/031,922, filed on May 29, 2020.

(51) Int. Cl.
*F01N 9/00*     (2006.01)
*F01N 3/10*     (2006.01)
(Continued)

(52) U.S. Cl.
CPC .............. *F01N 11/00* (2013.01); *F01N 3/106* (2013.01); *F01N 3/2066* (2013.01);
(Continued)

(58) Field of Classification Search
CPC .......... F01N 11/00; F01N 9/00; F01N 3/2066; F01N 3/106
See application file for complete search history.

(56) References Cited

U.S. PATENT DOCUMENTS

| | | |
|---|---|---|
| 8,196,390 B2 | 6/2012 | Lueders et al. |
| 9,010,087 B1 | 4/2015 | Upadhyay et al. |
| | (Continued) | |

FOREIGN PATENT DOCUMENTS

| | | | |
|---|---|---|---|
| DE | 102017204301 A1 * | 9/2018 | ............. F01N 11/00 |
| EP | 3 051 084 A1 | 8/2016 | |

OTHER PUBLICATIONS

English translation of DE-102017204301 by PE2E, Sep. 14, 23.*

(Continued)

*Primary Examiner* — Deming Wan
(74) *Attorney, Agent, or Firm* — FOLEY & LARDNER LLP (57) ABSTRACT

A method for diagnosing a NOx sensor is provided. The method includes receiving data indicative of operating conditions of an engine or an aftertreatment system; determining, during a first period of time, that an amount of NOx output from the aftertreatment system satisfies a low NOx operating mode condition; determining, during a second period of time, that operating conditions for ammonia slip are present based on data regarding operation of the aftertreatment system; responsive to the determination that operating conditions for ammonia slip are present, determining that the amount of NOx output from the aftertreatment system satisfies a high NOx operating mode condition; comparing a difference between a minimum value from the first period of time and a maximum value from a second period of time to a diagnostic threshold; and responsive to the difference being less than the diagnostic threshold, setting an alert.

20 Claims, 3 Drawing Sheets

(51) Int. Cl.
*F01N 3/20* (2006.01)
*F01N 11/00* (2006.01)
*F02D 41/02* (2006.01)

(52) U.S. Cl.
CPC ...... *F01N 2430/06* (2013.01); *F01N 2550/02* (2013.01); *F01N 2560/026* (2013.01); *F01N 2560/14* (2013.01); *F01N 2570/18* (2013.01); *F01N 2610/02* (2013.01); *F01N 2610/146* (2013.01); *F01N 2900/0408* (2013.01); *F01N 2900/0411* (2013.01); *F01N 2900/08* (2013.01); *F01N 2900/1602* (2013.01); *F01N 2900/1616* (2013.01); *F01N 2900/1622* (2013.01)

(56) References Cited

U.S. PATENT DOCUMENTS

| | | | |
|---|---|---|---|
| 9,192,892 B2 * | 11/2015 | Nunez | F01N 3/106 |
| 9,476,341 B2 | 10/2016 | Whitt et al. | |
| 9,494,096 B2 | 11/2016 | Pfaffinger | |
| 9,677,445 B2 | 6/2017 | Nunez et al. | |
| 9,926,827 B2 | 3/2018 | Chandra-Ramadugu et al. | |
| 2007/0251224 A1 * | 11/2007 | Andrews | F02D 41/222 60/277 |
| 2011/0185707 A1 | 8/2011 | Upadhyay et al. | |
| 2014/0208721 A1 | 7/2014 | Khaled et al. | |
| 2014/0331752 A1 | 11/2014 | Hall et al. | |
| 2015/0047318 A1 * | 2/2015 | Aliyev | F02D 41/0275 60/274 |
| 2018/0142590 A1 | 5/2018 | Gupta et al. | |
| 2018/0258873 A1 * | 9/2018 | Haas | F01N 9/00 |
| 2019/0024563 A1 * | 1/2019 | Wang | F01N 11/00 |

OTHER PUBLICATIONS

PCT International Search Report and Written Opinion for International Application No. PCT/US2021/034523 mailing date Aug. 24, 2021, 12 pages.

EPO Extended European Search Report issued in corresponding EPO Patent Application No. 21814492.1, dated Oct. 13, 2023, 7 pages.

* cited by examiner

SYSTEMS AND METHODS FOR DIAGNOSING NOx SENSOR BASED ON AMMONIA SLIP

CROSS-REFERENCE

The present application claims priority to and benefit of U.S. Application No. 63/031,922 titled "SYSTEMS AND METHODS FOR DIAGNOSING NOx SENSOR BASED ON AMMONIA SLIP," filed May 29, 2020, which is incorporated herein by reference in its entirety and for all purposes.

TECHNICAL FIELD

The present disclosure relates to diagnostics and prognostics for an exhaust aftertreatment system.

BACKGROUND

Exhaust aftertreatment systems are generally designed to reduce emission of particulate matter, nitrogen oxides (NOx), hydrocarbons, and other environmentally harmful pollutants. However, the components that make up the exhaust aftertreatment system can be susceptible to failure and degradation. Because the failure or degradation of components may have adverse consequences on performance and the emission-reduction capability of the exhaust aftertreatment system, the detection and, if possible, correction of failed or degraded components is desirable. Most regulations require on-board diagnostic (OBD) monitoring or testing of many of the components of the exhaust aftertreatment system. When equipped on vehicles, most monitoring and testing of aftertreatment system components are performed during on-road operation of the vehicle (e.g., while the vehicle is being driven on the road). Although such monitoring and testing may be convenient, the efficacy of the monitoring and testing may be limited because the engine cannot be operated outside of a given on-road calibrated operating range. Additionally, because on-road operating demands typically have priority over diagnostic and performance recovery procedures, the order, timing, and control of such procedures may be less than ideal. As a result, the detection and correction of various failure modes in the exhaust aftertreatment system may be limited.

SUMMARY

One embodiment relates to a system that includes: a controller comprising at least one processor coupled to a memory storing instructions that, when executed by the at least one processor, causes the controller to perform operations comprising: receive data indicative of operating conditions of at least one of an engine or of an aftertreatment system; determine, during a first period of time, that an amount of NOx output from the aftertreatment system satisfies a low NOx operating mode condition based on an analysis of the data indicative of the operating conditions; determine, during a second period of time, that operating conditions for ammonia slip are present based on data regarding operation of the aftertreatment system; responsive to the determination that operating conditions for ammonia slip are present, determine that the amount of NOx output from the aftertreatment system satisfies a high NOx operating mode condition; retrieve a minimum value of the amount of NOx output from the aftertreatment system during the first period of time; retrieve a maximum value of the amount of NOx output from the aftertreatment system during the second period of time; compare a difference between the minimum value and the maximum value to a diagnostic threshold; and responsive to the difference being less than the diagnostic threshold, set an alert.

Another embodiment relates to a method for diagnosing a NOx sensor. The method incudes: receiving data indicative of operating conditions of at least one of an engine or of an aftertreatment system; determining, during a first period of time, that an amount of NOx output from the aftertreatment system satisfies a low NOx operating mode condition based on the data indicative of operating conditions; determining, during a second period of time, that operating conditions for ammonia slip are present based on data regarding operation of the aftertreatment system; responsive to the determination that operating conditions for ammonia slip are present, determining that the amount of NOx output from the aftertreatment system satisfies a high NOx operating mode condition; retrieving a minimum value of the amount of NOx output from the aftertreatment system during the first period of time; retrieving a maximum value of the amount of NOx output from the aftertreatment system during the second period of time; comparing a difference between the minimum value and the maximum value to a diagnostic threshold; and responsive to the difference being less than the diagnostic threshold, setting an alert regarding the NOx sensor.

Another embodiment relates to a system that includes: an aftertreatment system in exhaust gas-receiving communication with an engine; and a controller coupled to the aftertreatment system and the engine, the controller configured to: receive data indicative of an operating condition of at least one of the engine or of the aftertreatment system; determine, during a first period of time, that an amount of NOx output from the aftertreatment system satisfies a low NOx operating mode condition based on the data indicative of the operating conditions; determine, during a second period of time, that operating conditions for ammonia slip are present based on data regarding operation of the aftertreatment system; responsive to the determination that operating conditions for ammonia slip are present, determine that the amount of NOx output from the aftertreatment system satisfies a high NOx operating mode condition; retrieve a minimum value of the amount of NOx output from the aftertreatment system during the first period of time; retrieve a maximum value of the amount of NOx output from the aftertreatment system during the second period of time; compare a difference between the minimum value and the maximum value to a diagnostic threshold; and responsive to the difference being less than the diagnostic threshold, set an alert.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Following below are more detailed descriptions of various concepts related to, and implementations of, methods, apparatuses, and systems for diagnosing a system-out NOx sensor based in part on conditions indicating high ammonia slip. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring to the Figures generally, the various embodiments disclosed herein relate to systems, apparatuses, and methods for diagnosing NOx sensors in an exhaust aftertreatment system. According to the present disclosure, a controller including at least one processor coupled to a memory storing instructions that, when executed by the at least one processor, causes the at least one processor to receive data indicative of operating conditions of an engine and of an aftertreatment system, determine, during a first period of time, that an amount of NOx output from the aftertreatment system is low based on analysis of the data indicative of operating conditions, determine, during a second period of time, that the amount of NOx output from the aftertreatment system is high based on analysis of the data indicative of operating conditions, retrieve a minimum value of the amount of NOx output from the aftertreatment system during the first period of time, retrieve a maximum value of the amount of NOx output from the aftertreatment system during the second period of time, compare a difference between the minimum value and the maximum value to a diagnostic threshold, and in response to the difference being less than the diagnostic threshold, set an alert.

As a brief overview, some engine systems include exhaust aftertreatment systems for decreasing the pollutants emitted from the engine systems. Among other components, these exhaust aftertreatment systems may include a selective catalytic reduction (SCR) system. The SCR system includes an SCR catalyst that is designed to reduce the nitrous oxides (NOx) in engine exhaust gas to nitrogen and other less harmful compounds. To accomplish this reduction, a reductant is sprayed into the exhaust gas stream prior to the exhaust gas reaching the SCR system. As the exhaust gas stream passes over the SCR catalyst, the NOx reacts with ammonia, which formed from the decomposition of the reductant, to form nitrogen and other less harmful compounds. In turn, a decrease in NOx emissions from the exhaust gas is accomplished. The efficiency of the SCR catalyst may be determined by measuring a quantity of NOx emissions remaining in the exhaust gas at the outlet of the SCR system or at another point, such as a system out location.

Because the measurement of the quantity of NOx emissions remaining in the exhaust gas at the outlet of the SCR system (i.e., system-out NOx) is the primary indication of the efficacy of the SCR system, if the system-out NOx sensor (also referred to as a tailpipe NOx sensor) is deteriorated or 'stuck,' the system-out NOx sensor is no longer trustworthy enough to effectively determine an efficacy of the SCR system because the system-out NOx sensor is either not properly sensing an amount of NOx in the exhaust or is reacting too slowly to changes in an amount of NOx in the exhaust. Further, in those systems in which reductant dosing is tied to the system-out NOx sensor, if the system-out NOx sensor is stuck, control of the reductant dosing is jeopardized.

According to the present disclosure, a controller continually samples output data from the system-out NOx sensor. Based on internal and external operating conditions, if the controller determines the engine to produce NOx at a relative extreme pole (e.g., producing a relatively high amount of NOx), the controller then analyzes the continually-sampled data. For example, if the operating conditions are such that the controller determines the engine to be producing relatively high amounts of NOx (e.g., high DEF dosing levels, low SCR catalyst temperature, etc.), the controller examines the continually-sampled data in order to identify a maximum sensed value during that period of high NOx production. Then, if the operating conditions are such that the controller determines the engine to be producing relatively low amounts of NOx (e.g., low DEF dosing levels, low engine fueling, etc.), the controller examines the continually-sampled data to identify a minimum sensed value during that period of low NOx production. Once the controller has determined a maximum and a minimum value, the controller determines a difference in that maximum and minimum to a diagnostic threshold in order to assess if the system out NOx sensor is properly responsive. If the difference does not exceed the diagnostic threshold, the controller determines that the system-out NOx sensor is 'stuck' and not sufficiently responsive to changes in the amount of NOx in the exhaust stream. In response to this determination, the controller then raises a failure alert, which can include setting a fault code, notifying a user, and diverting NOx monitoring responsibilities to an engine-out NOx sensor. The systems and methods of the present disclosure provide technical benefits of more robust diagnostic capabilities from associating NOx output with ammonia slip and a reduction in processing demands due to the controller only selectively actively analyzing system-out NOx sensor data when certain operating conditions are met, which decreases demand on computing resources. In addition, the systems and methods herein provide a technical advantage by isolating a malfunction with the system-out NOx sensor as being a stuck-in failure, in order to expedite repairs or other remedies. Further, the systems and methods herein actively respond to a stuck system-out NOx sensor by notifying the user and shifting emissions-monitoring responsibilities to a secondary sensor in order to reduce potential fallout from a faulty sensor.

Figure 1:
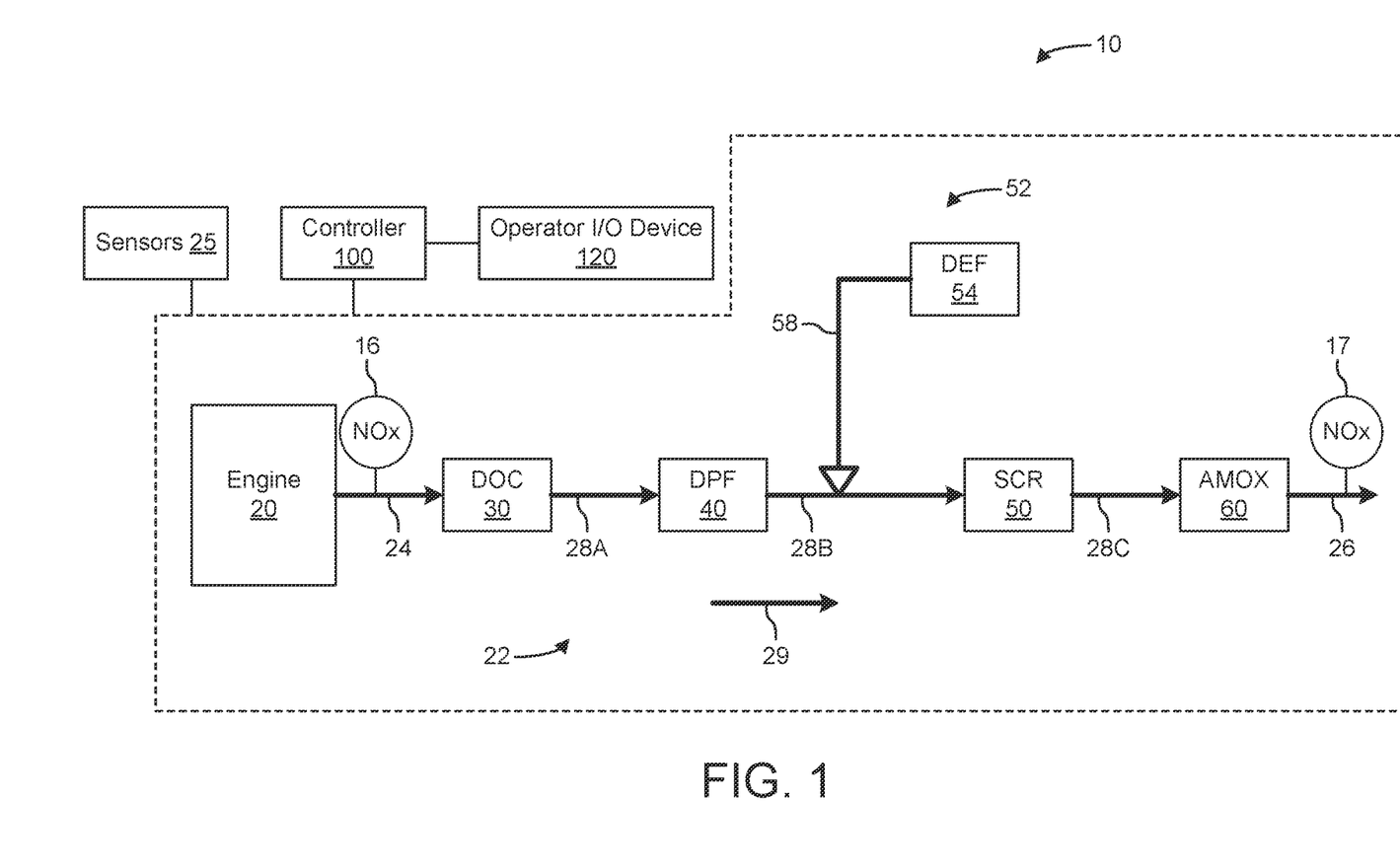
FIG. 1 is a schematic diagram of an engine system, according to an example embodiment.

Referring now to FIG. 1, an engine exhaust aftertreatment system with a controller is shown, according to an example embodiment. The engine system 10 includes an internal combustion engine 20 and an exhaust aftertreatment system 22 in exhaust gas-receiving communication with the engine 20. According to one embodiment, the engine system 10 is embodied within a vehicle. The vehicle may include an on-road or an off-road vehicle including, but not limited to, line-haul trucks, mid-range trucks (e.g., pick-up truck, etc.), sedans, coupes, tanks, airplanes, boats, and any other type of vehicle. Based on these configurations, various additional types of components may also be included in the system, such as a transmission, one or more gearboxes, pumps, actuators, or anything that is powered by an engine.

The engine 20 may be an internal combustion engine (e.g., gasoline, natural gas, or diesel engines), a hybrid engine system (e.g., a combination of an internal combustion engine and an electric motor), and/or any other suitable engine. In the example shown, the engine 20 is structured as a compression-ignition engine powered by diesel fuel. Within the internal combustion engine 20, air from the atmosphere is combined with fuel, and combusted, to power the engine. Combustion of the fuel and air in the compression chambers of the engine 20 produces exhaust gas that is operatively vented to an exhaust manifold and to the exhaust aftertreatment system 22.

In the example depicted, the exhaust aftertreatment system 22 includes a diesel particular filter (DPF) 40, a diesel oxidation catalyst (DOC) 30, a selective catalytic reduction (SCR) system 52 with a SCR catalyst 50, and an ammonia oxidation (AMOx) catalyst 60. The SCR system 52 further includes a reductant delivery system that has a diesel exhaust fluid (DEF) source 54 that supplies DEF to a DEF doser 56 via a DEF line 58.

In an exhaust flow direction, as indicated by directional arrow 29, exhaust gas flows from the engine 20 into inlet piping 24 of the exhaust aftertreatment system 22. From the inlet piping 24, the exhaust gas flows into the DOC 30 and exits the DOC into a first section of exhaust piping 28A. From the first section of exhaust piping 28A, the exhaust gas flows into the DPF 40 and exits the DPF into a second section of exhaust piping 28B. From the second section of exhaust piping 28B, the exhaust gas flows into the SCR catalyst 50 and exits the SCR catalyst into the third section of exhaust piping 28C. As the exhaust gas flows through the second section of exhaust piping 28B, it is periodically dosed with DEF by the DEF doser 56. Accordingly, the second section of exhaust piping 28B acts as a decomposition chamber or tube to facilitate the decomposition of the DEF to ammonia. From the third section of exhaust piping 28C, the exhaust gas flows into the AMOx catalyst 60 and exits the AMOx catalyst into outlet piping 26 before the exhaust gas is expelled from the exhaust aftertreatment system 22. Based on the foregoing, in the illustrated embodiment, the DOC 30 is positioned upstream of the DPF 40 and the SCR catalyst 50, and the SCR catalyst 50 is positioned downstream of the DPF 40 and upstream of the AMOX catalyst 60. However, in alternative embodiments, other arrangements of the components of the exhaust aftertreatment system 22 are also possible The DOC 30 may have any of various flow-through designs. Generally, the DOC 30 is structured to oxidize at least some particulate matter, e.g., the soluble organic fraction of soot, in the exhaust and reduce unburned hydrocarbons and CO in the exhaust to less environmentally harmful compounds. For example, the DOC 30 may be structured to reduce the hydrocarbon and CO concentrations in the exhaust to meet the requisite emissions standards for those components of the exhaust gas. An indirect consequence of the oxidation capabilities of the DOC 30 is the ability of the DOC to oxidize NO into NO2. In this manner, the level of NO2 exiting the DOC 30 is equal to the NO2 in the exhaust gas generated by the engine 20 plus the NO2 converted from NO by the DOC.

The DPF 40 may be any of various flow-through or wall-flow designs, and is structured to reduce particulate matter concentrations, e.g., soot and ash, in the exhaust gas to meet or substantially meet requisite emission standards. The DPF 40 captures particulate matter and other constituents, and thus may need to be periodically regenerated to burn off the captured constituents. Additionally, the DPF 40 may be configured to oxidize NO to form NO2 independent of the DOC 30.

As discussed above, the SCR system 52 may include a reductant delivery system with a reductant (e.g., DEF) source 54, a pump and a delivery mechanism or doser 56. The reductant source 54 can be a container or tank capable of retaining a reductant, such as, for example, ammonia (NH3), DEF (e.g., urea), or diesel oil. The reductant source 54 is in reductant supplying communication with the pump, which is configured to pump reductant from the reductant source to the delivery mechanism 56 via a reductant delivery line 58. The delivery mechanism 56 is positioned upstream of the SCR catalyst 50. The delivery mechanism 56 is selectively controllable to inject reductant directly into the exhaust gas stream prior to entering the SCR catalyst 50. In some embodiments, the reductant may either be ammonia or DEF, which decomposes to produce ammonia. As briefly described above, the ammonia reacts with NOx in the presence of the SCR catalyst 50 to reduce the NOx to less harmful emissions, such as N2 and H2O. The NOx in the exhaust gas stream includes NO2 and NO. Generally, both NO2 and NO are reduced to N2 and H2O through various chemical reactions driven by the catalytic elements of the SCR catalyst in the presence of NH3.

The SCR catalyst 50 may be any of various catalysts known in the art. For example, in some implementations, the SCR catalyst 50 is a vanadium-based catalyst, and in other implementations, the SCR catalyst is a zeolite-based catalyst, such as a Cu-Zeolite or a Fe-Zeolite catalyst.

The AMOx catalyst 60 may be any of various flow-through catalysts configured to react with ammonia to produce mainly nitrogen. As briefly described above, the AMOx catalyst 60 is structured to remove ammonia that has slipped through or exited the SCR catalyst 50 without reacting with NOx in the exhaust. In certain instances, the exhaust aftertreatment system 22 may be operable with or without an AMOx catalyst. Further, although the AMOx catalyst 60 is shown as a separate unit from the SCR catalyst 50 in FIG. 1, in some implementations, the AMOx catalyst may be integrated with the SCR catalyst, e.g., the AMOx catalyst and the SCR catalyst can be located within the same housing. According to the present disclosure, the SCR catalyst and AMOx catalyst are positioned serially, with the SCR catalyst preceding the AMOx catalyst. As described above, in various other embodiments, the AMOx catalyst is not included in the exhaust aftertreatment system 22.

As shown in FIG. 1, a variety of sensors 25 are included in the engine system. The sensors 25 are coupled, particularly communicatively coupled, to the controller 100, such that the controller 100 can monitor and acquire data indicative of operation of the system 10. The sensors 25 may include one or more of a NOx sensor (e.g., to monitor an amount of NOx in the exhaust exiting the engine 20 or the aftertreatment system 22), a temperature sensor (e.g., to determine a temperature of a bed of the SCR catalyst 50), a flow sensor (e.g., to determine a flow rate of exhaust through the aftertreatment system 22), an ammonia sensor (e.g., to sense an amount of ammonia in the exhaust stream after the SCR system 52), or any other type of sensor that can provide information related to the operation of the engine 20 and of the aftertreatment system 22. Specifically, the system includes at least one NOx sensor positioned downstream of the engine 20, which is shown in FIG. 1 as an engine-out NOx sensor 16, and at least one NOx sensor positioned downstream of the aftertreatment system 22, which is shown in FIG. 1 as a system-out (or tailpipe) NOx sensor 17. In an exemplary embodiment, an amount and timing of DEF dosing from the reductant source 54 into the SCR system 52 is based on a closed loop feedback system involving the engine-out NOx sensor 16 and the system-out NOx sensor 17. In this embodiment, the controller 100 determines an efficiency of the SCR system 52 by comparing an amount of NOx present in the exhaust before the SCR system (i.e., at the engine-out NOx sensor 16) and an amount of NOx present in the exhaust after the SCR system (i.e., at the system-out NOx sensor 17). Then, based on that determined efficiency, the controller adjusts the amount and timing of DEF dosing.

Because there are various sensed values (e.g. bed temperature of the SCR catalyst 50, injection rate of DEF, flow rate of exhaust, etc.) that are indicative of an amount of NOx remaining in the exhaust after passing through the exhaust aftertreatment system, the controller 100 can predict or otherwise determine a relative amount of NOx expected to be remaining in the exhaust after passing through the exhaust aftertreatment system based on an analysis of these values.

Although the exhaust aftertreatment system 22 shown includes one of a DOC 30, DPF 40, SCR catalyst 50, and AMOx catalyst 60 positioned in specific locations relative to each other along the exhaust flow path, in other embodiments, the exhaust aftertreatment system may include more than one of any of the various catalysts positioned in any of various positions relative to each other along the exhaust flow path as desired FIG. 1 is also shown to include an operator input/output (I/O) device 120. The operator I/O device 120 is communicably coupled to the controller 100, such that information may be exchanged between the controller 100 and the I/O device 120, wherein the information may relate to one or more components of FIG. 1 or determinations (described below) of the controller 100. The operator I/O device 120 enables an operator of the engine system 10 to communicate with the controller 100 and one or more components of the engine system 10 of FIG. 1. For example, the operator input/output device 120 may include, but is not limited to, an interactive display, a touchscreen device, one or more buttons and switches, voice command receivers, etc. In various alternate embodiments, the controller 100 and components described herein may be implemented with non-vehicular applications (e.g., a power generator). Accordingly, the I/O device may be specific to those applications. For example, in those instances, the I/O device may include a laptop computer, a tablet computer, a desktop computer, a phone, a watch, a personal digital assistant, etc. Via the I/O device 120, the controller 100 may provide a fault or service notification based on the determined state of the system-out NOx sensor 17.

As the components of FIG. 1 are shown to be embodied in the system 10, the controller 100 may be structured as one or more electronic control units (ECU). The controller 100 may be separate from or included with at least one of a transmission control unit, an exhaust aftertreatment control unit, a powertrain control module, an engine control module, etc. The function and structure of the controller 100 is described in greater detail in FIG. 2.

Components of the vehicle may communicate with each other or foreign components (e.g., a remote operator) using any type and any number of wired or wireless connections. Communication between and among the controller 100 and the components of the vehicle may be via any number of wired or wireless connections (e.g., any standard under IEEE 802). For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

Figure 2:
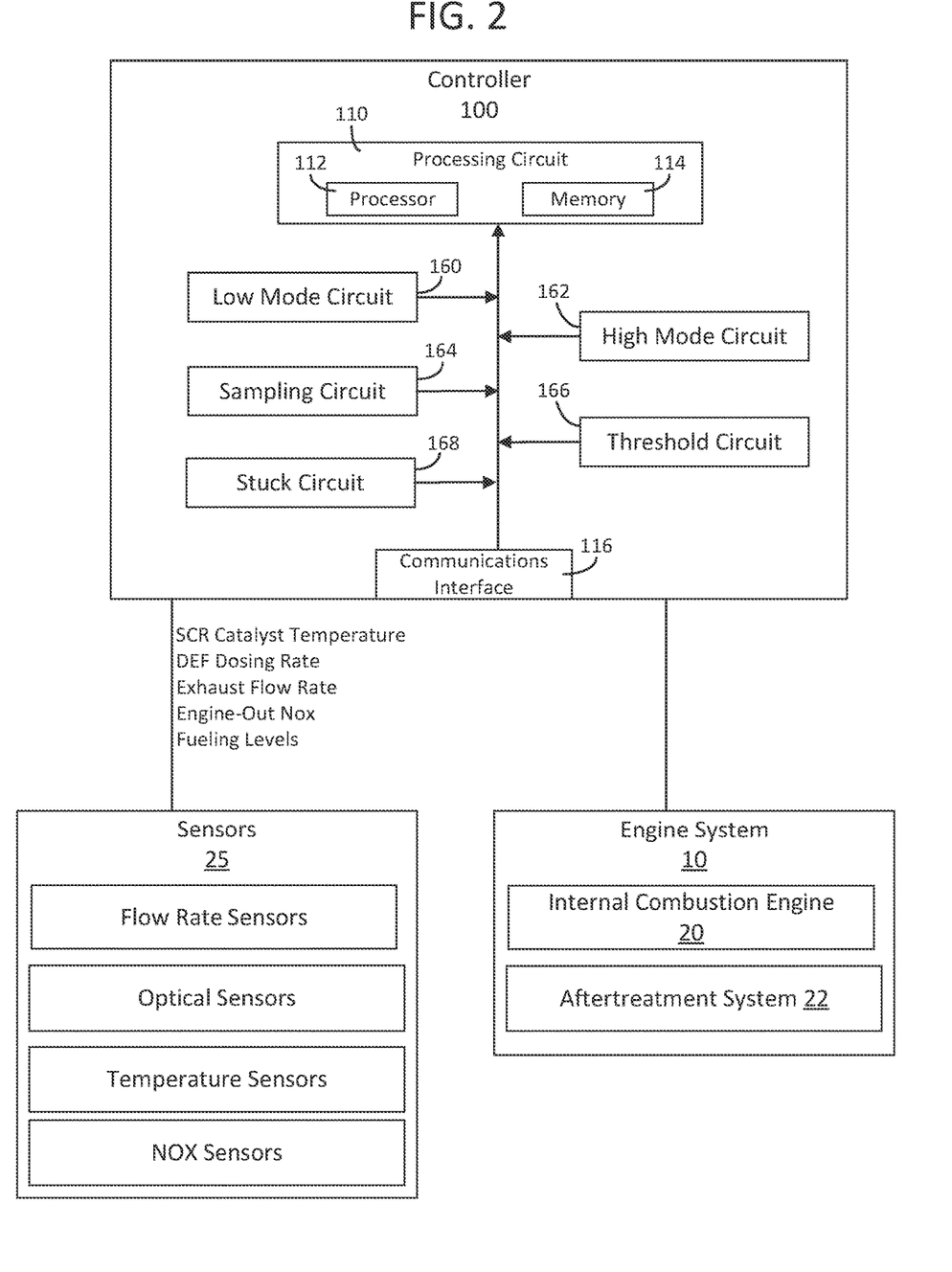
FIG. 2 is a schematic view of a controller of the engine system of FIG. 1, according to an example embodiment.

Referring now to FIG. 2, a schematic diagram of the controller 100 of the system 10 of FIG. 1 is shown according to an example embodiment. As shown in FIG. 2, the controller 100 includes a processing circuit 110 having a processor 112 and a memory 114, a low mode circuit 160, a high mode circuit 162, a sampling circuit 164, a threshold circuit 166, a stuck circuit 168, and a communications interface 116. The controller 100 is structured to monitor operating condition data, particularly data regarding possible ammonia slip (e.g., conditions indicative of ammonia slip above a threshold value), for the system 10 in order to determine when the system 10 is operating in a high NOx mode or a low NOx mode. Then, based on this determination, the controller then determines a difference between a minimum and a maximum sensed value from the system-out NOx sensor 17 and compares this difference to a diagnostic threshold in order to determine if the system-out NOx sensor 17 is properly responsive or if the system-out NOx sensor 17 is stuck.

In one configuration, the low mode circuit 160, the high mode circuit 162, the sampling circuit 164, the threshold circuit 166, and the stuck circuit 168 are embodied as machine or computer-readable media carrying or having machine-executable instructions or data structures stored thereon that is executable by a processor, such as processor 112. As described herein and amongst other uses, the instructions facilitate performance of certain operations to enable reception and transmission of data. For example, the instructions may provide command to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the low mode circuit 160, the high mode circuit 162, the sampling circuit 164, the threshold circuit 166, and the stuck circuit 168 are embodied as hardware units, such as electronic control units. As such, the low mode circuit 160, the high mode circuit 162, the sampling circuit 164, the threshold circuit 166, and the stuck circuit 168 may be embodied as one or more circuitry components including, but not limited to, processing circuitry, network interfaces, peripheral devices, input devices, output devices, sensors, etc. In some embodiments, the low mode circuit 160, the high mode circuit 162, the sampling circuit 164, the threshold circuit 166, and the stuck circuit 168 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the low mode circuit 160, the high mode circuit 162, the sampling circuit 164, the threshold circuit 166, and the stuck circuit 168 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The low mode circuit 160, the high mode circuit 162, the sampling circuit 164, the threshold circuit 166, and the stuck circuit 168 may also include programmable hardware devices such as field programmable gate arrays, programmable array logic, programmable logic devices or the like. The low mode circuit 160, the high mode circuit 162, the sampling circuit 164, the threshold circuit 166, and the stuck circuit 168 may include one or more memory devices for storing instructions that are executable by the processor(s) of the low mode circuit 160, the high mode circuit 162, the sampling circuit 164, the threshold circuit 166, and the stuck circuit 168. The one or more memory devices and processor(s) may have the same definition as provided herein with respect to the memory 114 and processor 112. In some hardware unit configurations, the low mode circuit 160, the high mode circuit 162, the sampling circuit 164, the threshold circuit 166, and the stuck circuit 168 may be geographically dispersed throughout separate locations in the vehicle. Alternatively and as shown, the low mode circuit 160, the high mode circuit 162, the sampling circuit 164, the threshold circuit 166, and the stuck circuit 168 may be embodied in or within a single unit/housing, which is shown as the controller 100.

In the example shown, the controller 100 includes the processing circuit 110 having the processor 112 and the memory 114. The processing circuit 110 may be structured or configured to execute or implement the instructions, commands, and/or control processes described herein with respect to the low mode circuit 160, the high mode circuit 162, the sampling circuit 164, the threshold circuit 166, and the stuck circuit 168. The depicted configuration represents the low mode circuit 160, the high mode circuit 162, the sampling circuit 164, the threshold circuit 166, and the stuck circuit 168 as machine or computer-readable instructions. However, as mentioned above, this illustration is not meant to be limiting as the present disclosure contemplates other embodiments where the low mode circuit 160, the high mode circuit 162, the sampling circuit 164, the threshold circuit 166, and the stuck circuit 168, or at least one circuit of the low mode circuit 160, the high mode circuit 162, the sampling circuit 164, the threshold circuit 166, and the stuck circuit 168, is configured as a hardware unit. All such combinations and variations are intended to fall within the scope of the present disclosure.

The processor 112 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the low mode circuit 160, the high mode circuit 162, the sampling circuit 164, the threshold circuit 166, and the stuck circuit 168 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory 114 (e.g., memory unit, storage device) may include one or more devices (e.g., RAM, ROM, Flash memory, hard disk storage) for storing data and/or computer code for completing or facilitating the various processes, layers and modules described in the present disclosure. The memory 114 may be coupled to the processor 112 to provide computer code or instructions to the processor 112 for executing at least some of the processes described herein. Moreover, the memory 114 may be or include tangible, non-transient volatile memory or non-volatile memory. Accordingly, the memory 114 may include database components, object code components, script components, or any other type of information structure for supporting the various activities and information structures described herein.

The low mode circuit 160 is configured or structured to analyze operating conditions regarding the engine 20 and aftertreatment system 22 and to predict or determine that the system 22 is outputting a relatively low amount of NOx (a low NOx mode or operating mode). The relatively low amount of NOx may be defined as a pre-determined threshold or as a low NOx mode operating condition. In some embodiments, the pre-determined threshold is established based on a look-up table or map of NOx outputs stored in the memory 114. Operating condition data is received from the sensors 25 and includes at least one of fueling levels for the engine 20, a temperature of the SCR catalyst 50 bed, an injection rate of DEF, a flow rate of exhaust through the aftertreatment system 22, and an amount of NOx produced by the engine 20 (i.e., engine-out NOx as read by the engine-out NOx sensor 16). The low mode circuit 160 then analyzes this data in order to determine an amount of system-out NOx. For example, if the fueling levels for the engine 20 are low, indicating that the engine 20 is in a low fueling state (e.g., less than 5-20 mg/stroke), the low mode circuit 160 determines that a low amount of NOx is being output by the aftertreatment system 22 because an engine in a low fueling state produces less NOx. In another example, if the temperature of the SCR catalyst 50 bed is at or above a pre-determined operating temperature (i.e., a temperature at which the SCR catalyst 50 is able to efficiently react with the NOx and ammonia in the exhaust flow), the low mode circuit 160 determines that a low amount of NOx is being output by the aftertreatment system 22 because the low mode circuit expects that the SCR system 52 is working efficiently to reduce NOx in the exhaust flow. In addition, if the operating condition data indicates that ammonia release is not expected, or if the high mode circuit 162 does not determine high ammonia slip (discussed in further depth below), the low mode circuit 160 determines that the system-out NOx is low.

Once the low mode circuit 160 determines that the system-out NOx is low (i.e., at or below the pre-determined threshold and thereby satisfying the low NOx mode operating condition), the low mode circuit 160 continues to monitor the operation condition data to determine if the low system-out NOx persists. If conditions for a determined low system-out NOx persist for a pre-determined period of time (e.g., if the engine 20 remains in a low fueling state for more than the pre-determined period of time), then the low mode circuit 160 sets a low system-out NOx flag. An amount of the pre-determined period of time may be set by a user via the operator I/O device 120 or may be automatically set by the low mode circuit 160 based on operation conditions data or other information, such as an age of components in the aftertreatment system. In an exemplary embodiment, the pre-determined period of time is 5-100 seconds. Alternatively, if the conditions for a determined low system-out NOx fail to persist for the pre-determined period of time, the low mode circuit 160 does not set the low system-out NOx flag. In addition, if the low mode circuit 160 initially set the low system-out NOx flag but determines that conditions no longer persist, the low mode circuit 160 retracts or resets the low system-out NOx flag. As such, the low system-out NOx flag is an internal marker for the controller 100 that indicates that the low mode circuit 160 has determined or predicted that conditions for low system-out NOx and serves to trigger the sampling circuit 164 to retrieve relevant data from the system-out NOx sensor 17.

The high mode circuit 162 is configured or structured to analyze operating conditions regarding the engine 20 and aftertreatment system 22 and to determine that the system 22 is outputting a relatively high amount of NOx (a high NOx mode or operating mode). The relatively high amount of NOx may be defined as a pre-determined threshold or as a high NOx mode operating condition. In some embodiments, the pre-determined threshold is established based on a look-up table or map of NOx outputs stored in the memory 114. This determination is made if the high mode circuit 162 determines that the engine 20 and aftertreatment system 22 if the operating conditions indicate either that the SCR system 52 has a low conversion efficiency or that there is ammonia slip. Operating condition data is received from the sensors 25 and include at least one of a temperature of the SCR catalyst 50 bed, an injection rate of DEF, a flow rate of exhaust through the aftertreatment system 22, and an amount of NOx produced by the engine 20 (i.e., engine-out NOx as read by the engine-out NOx sensor 16). The high mode circuit 162 then analyzes this data in order to determine if conditions exist for either low SCR efficiency or high ammonia slip.

Low SCR efficiency refers to a situation, in an exemplary embodiment, in which the conversion efficiency (i.e., a percentage of NOx in the exhaust entering the SCR system 52 that is reduced by the SCR catalyst 50) is less than a predefined threshold, such as 85%. As such, the high mode circuit 162 determines that the SCR system 52 is experiencing a period of low efficiency if the operating condition data indicates that the SCR conversion efficiency is below 85%. For example, if a temperature of the SCR catalyst 50 bed is less than 220° C., if the temperature of the SCR catalyst 50 bed is greater than 450° C., if the exhaust flow rate is more than 200-400 g/s, or if the engine-out NOx flow rate is greater than 0.25-0.4 g/s, the high mode circuit 162 determines that the SCR system 52 is experiencing a period of low efficiency. In some embodiments, the high mode circuit 162 determines that the SCR system 52 is experiencing low efficiency based on transient deNOx (i.e., NOx conversion). Transient deNOx is determined based on engine-out NOx deviation from a lagging moving average. If the transient deNOx is relatively high positive deviation (e.g., 50-200 ppm), the transient deNOx is determined to be poor, which might indicate low SCR efficiency.

High ammonia slip refers to a situation, in an exemplary embodiment, in which an amount of ammonia remaining in the exhaust stream after passing through the SCR system 52 is between 25-500 ppm (or within another range, or above a predefined threshold). As such, the high mode circuit 162 determines or predicts that the SCR system 52 is experiencing a period of high ammonia slip if the operating condition data indicates that conditions are present for the amount of ammonia remaining in the exhaust stream being greater than 25 ppm. For example, if a temperature of the SCR catalyst 50 bed is exhibiting a high rate of change, the high mode circuit 162 determines that conditions are present for the SCR system 52 to experience a period of high ammonia slip. Rate of change calibration varies with the SCR catalyst 50 bed temperature in order to match catalyst storage characteristics with catalyst temperature, but is generally tuned to a range of 0.2-1° C./s. A time constant filter (e.g., 10-300 seconds) is applied to the rate of change in order to mimic the dynamic ammonia release profile of the catalyst. At lower SCR catalyst 50 bed temperatures, ammonia release is triggered by a higher rate of temperature change because ammonia storage capacity is larger at a lower SCR catalyst bed temperature. As such, a high rate of temperature change can be found at a low SCR catalyst 50 bed temperature or a high ammonia storage. Because a high rate of temperature change is associated with high ammonia slip, then high ammonia slip can similarly be found at a low SCR catalyst 50 bed temperature or a high ammonia storage. Ammonia storage is monitored via a timer that tracks high Ammonia to NOx Ratio (ANR) dosing for various time periods (e.g., 100-300 seconds) for an SCR catalyst 50 bed temperature between certain a temperature range (e.g., 200-300° C.). The timer is in place to ensure excess ammonia is available in storage, and is reset when conditions indicate storage loss (e.g., SCR catalyst 50 bed temperature above 400° C., vehicle keyed off for more than 24 hours, etc.). Ammonia storage can also be determined based on an ammonia release model that estimates an amount of ammonia being released from ammonia storage as a function of operating condition data (e.g., SCR catalyst 50 bed temperature, exhaust flow, DEF dosing, etc.). The high mode circuit 162 can also determine that conditions are present for high ammonia slip based on data received from the ammonia sensor.

In other embodiments, the high mode circuit 162 can determine an amount of ammonia slip based on the operating condition data. Rather than determining or predicting that conditions for ammonia slip are present, in these embodiments, the high mode circuit determines the actual or estimated amount of ammonia slip. This estimation may be based on an ammonia release model, data received from the ammonia sensor, or one or more algorithms, look-up tables, and the like that correlate certain data to estimations of ammonia slip amounts (e.g., SCR catalyst 50 bed temperature, DEF dosing levels, etc.).

Thus, the high mode circuit 162 may determine that ammonia slip is occurring or likely occurring based on various operation data. Alternatively or additionally, the high mode circuit 162 may determine an actual, predicted, or estimated amount of ammonia slip. In either situation, the presence (and, sometimes, amount) of ammonia slip may be determined and utilized by the controller.

In some embodiments, only one condition (i.e., either low SCR efficiency or high ammonia slip) is utilized/met for the high mode circuit to determine high system-out NOx. In other embodiments, both conditions are utilized/met for the high mode circuit to determine high system-out NOx.

Once the high mode circuit 162 determines that the system-out NOx is high (i.e., at or above the threshold and thereby satisfying the high NOx mode operating condition), the high mode circuit 162 continues to monitor the operation condition data to determine if the high system-out NOx persists. If conditions for a determined high system-out NOx persist for a pre-determined period of time (e.g., if the SCR catalyst 50 temperature remains low for the pre-determined period of time), then the high mode circuit 162 sets a high system-out NOx flag. An amount of the pre-determined period of time may be set by a user via the operator I/O device or may be automatically set by the high mode circuit 162 based on operation conditions data or other information, such as an age of components in the aftertreatment system. In an exemplary embodiment, the pre-determined period of time is equal to 30-300 seconds. Alternatively, if the conditions for a determined high system-out NOx fail to persist for the pre-determined period of time, the high mode circuit 162 does not set the high system-out NOx flag. In addition, if the high mode circuit 162 initially sets the high system-out NOx flag but determines that conditions no longer persist, the high mode circuit 162 retracts or resets the high system-out NOx flag. As such, the high system-out NOx flag is an internal marker for the controller 100 that indicates that the high mode circuit 162 has determined or predicted that conditions for high system-out NOx and serves to trigger the sampling circuit 164 to retrieve relevant data from the system-out NOx sensor 17.

The low mode circuit 160 and the high mode circuit 162, in some embodiments, operate in a feedback loop such results of one circuit's analyses serve as inputs for the other. For example, if the low mode circuit 160 sets a low system-out NOx flag, then the high mode circuit 162 automatically pauses analysis because conditions for low system-out NOx and high system-out NOx cannot exist simultaneously. Alternatively, if the low mode circuit 160 does not determine low system-out NOx, the high mode circuit 162 takes that information into consideration for a high system-out NOx determination.

The sampling circuit 164 is configured or structured to receive the low system-out NOx flag from the low mode circuit 160 or the high system-out NOx flag from the high mode circuit 162 and pull data from the system-out NOx sensor 17 accordingly. When the sampling circuit 164 receives the low system-out NOx flag, the sampling circuit 164 identifies a minimum value of the NOx values sensed by the system-out NOx sensor 17 during the time in which the low system-out NOx flag (or indicator/indication) is set. Alternatively, when the sampling circuit 164 receives the high system-out NOx flag, the sampling circuit 164 identifies a maximum value of the NOx values sensed by the system-out NOx sensor 17 during the time in which the high system-out NOx flag is set. In one embodiment, the sampling circuit 164 does not sample sensed data from the system-out NOx sensor 17 unless either the low system-out NOx flag or the high system-out NOx flag is set in order to reduce demand on the processing circuit 110 such that the low system-out NOx flag and the high system-out NOx flag are trigger conditions for the sampling circuit 164. Once the sampling circuit 164 has identified both of the minimum value and the maximum value, the sampling circuit 164 determines a NOx delta value, which is defined as a difference between the minimum value and the maximum value. A higher NOx delta value indicates a relatively larger difference in the minimum value and the maximum value, which may indicate a healthy or no error condition for the system-out NOx sensor 17. A lower NOx delta value indicates a relatively smaller difference in the minimum value and the maximum value, which may indicate a system out NOx sensor error.

The threshold circuit 166 is configured or structured to receive the NOx delta from the sampling circuit 164 and to compare the NOx delta to a diagnostic threshold. The diagnostic threshold is indicative of a properly function (e.g., not 'stuck') system-out NOx sensor 17, which may be based on an age of the system-out NOx sensor 17, the status of other components within the system 10, or operator preference. In an exemplary embodiment, the diagnostic threshold is 2-20 ppm. If NOx delta is less than the diagnostic threshold, which indicates that the system-out NOx sensor 17 is not reacting enough to the extremes in system-out NOx levels, the threshold circuit 166 determines that the system-out NOx sensor 17 is malfunctioning and, particularly, a 'stuck' failure condition. In response to this determination, the threshold circuit 166 sets a system-out NOx sensor alert. As such, the system-out NOx sensor alert is an indication that a NOx sensor (particularly the system-out NOx sensor) is 'stuck' or malfunctioning. In some embodiments, the system-out NOx sensor alert includes a fault code, an indicator lamp, a notification broadcast to a remote attendant, or an error message on the dashboard. Alternatively, if NOx delta is equal to or greater than the diagnostic threshold, which would indicate that the system-out NOx sensor 17 is operating as intended by reacting to the extremes in system-out NOx levels, the threshold circuit 166 determines that the system-out NOx sensor 17 is not malfunctioning or stuck. In response to this determination, the threshold circuit 166 either declines to set or clears the system-out NOx sensor alert.

The stuck circuit 168 is configured or structured to receive the system-out NOx sensor alert from the threshold circuit 166 and to take appropriate action. In some embodiments, the stuck circuit 168, via the operator I/O device 120, notifies the user of the malfunctioning system-out NOx sensor 17. In other embodiments, upon receiving the indication from the threshold circuit 166 (e.g., a set fault code), the stuck circuit 168 exits the closed feedback loop control system for DEF dosing based on the engine-out NOx sensor 16 and the system-out NOx sensor 17 and begins DEF dosing based on the engine-out NOx sensor 16 in an open loop control (i.e., one NOx sensor). In addition, the stuck circuit 168 aborts monitoring of the SCR system 52 conversion efficiency, which is the metric used primarily to monitor NOx in the exhaust flow. Many jurisdictions have NOx regulations, some of which require tracking a tail-pipe NOx output using the system-out NOx sensor 17. In this embodiment, the stuck circuit 168 pauses this tracking in response to receiving the indication from the threshold circuit 166. Therefore NOx monitoring is not diverted, rather the overall SCR DEF control is diverted to engine-out NOx sensor 16. In this regard and as mentioned above, DEF dosing levels are determined by the engine-out NOx sensor 16 in an open loop control. Feedback control will be exited since system out NOx sensor is not trustworthy. In another embodiment, the stuck circuit 168 disables monitoring of the SCR system 52 efficiency, thereby saving computing power.

Figure 3:
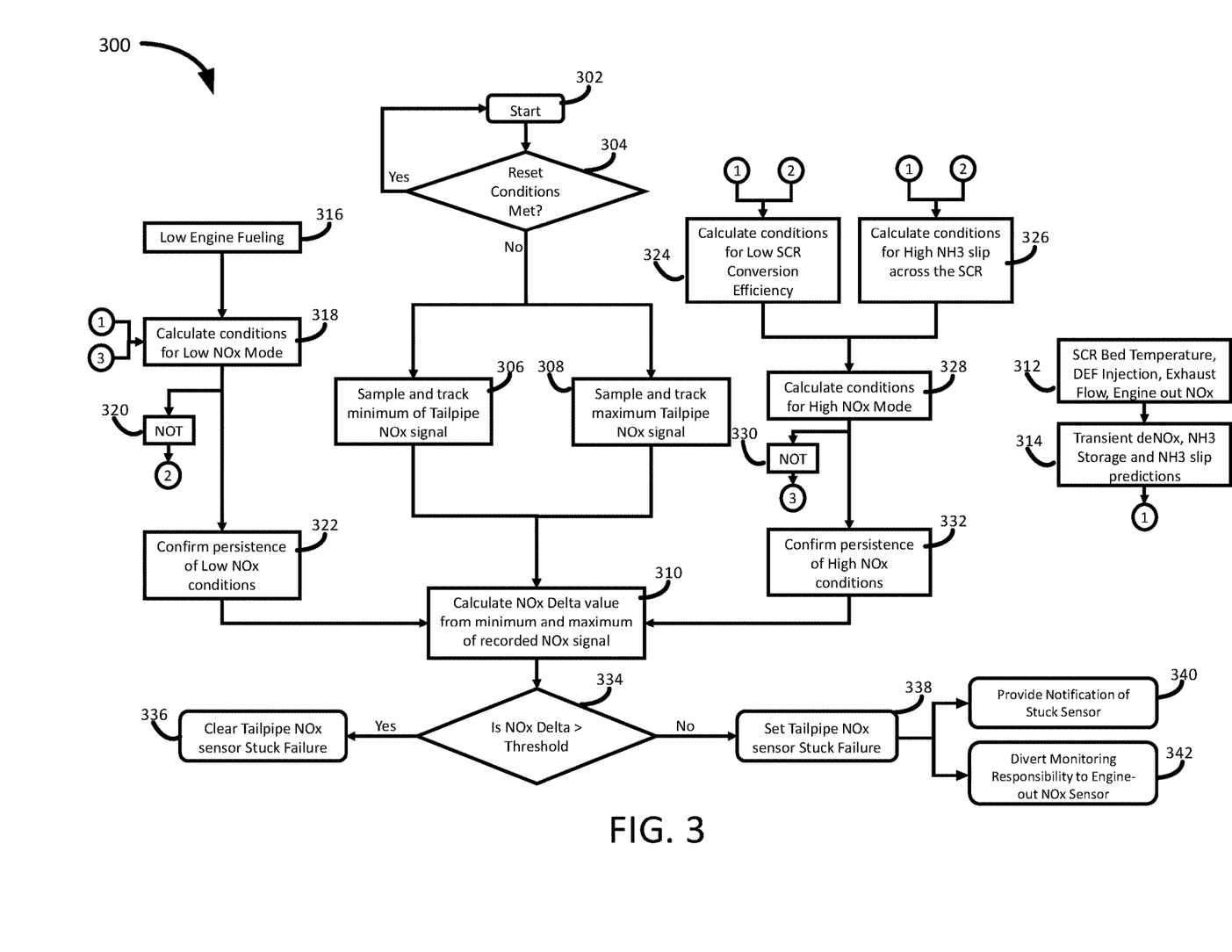
FIG. 3 is a flow diagram of a method for diagnosing a system-out NOx sensor, according to an example embodiment.

According to FIG. 3, a method 300 for diagnosing a NOx sensor is shown, according to an example. The method 300 may be performed, at least partly, by the controller 100 such that reference may be made to help explain method 300.

The method 300 begins at process 302 and proceeds to determine if reset conditions are met at decision 304. If the reset conditions are met (i.e., the inputs for the method 300 are not trustworthy), then the method returns to the start at step 302. For example, if the system 10 includes failure codes for the sensors 25, the engine 20, or for any other relevant component in the system 10, the reset conditions are met because the method 300 is unable to trust inputs received from faulty sensors or a malfunctioning engine. If the reset conditions are not met (i.e., no failures are present in the system 10 that would raise uncertainty around inputs for the method 300), then the method 300 proceeds to steps 306 and 308.

At step 306, the controller 100 samples and, particularly continually samples, an amount of NOx sensed by the system-out NOx sensor 17 and tracks a minimum value. At step 308, the controller 100 samples and, particularly continually samples, an amount of NOx sensed by the system-out NOx sensor 17 and tracks a maximum value. Before the method 300 proceeds to step 310, and in this embodiment, certain prerequisites at steps 322 and 332 must be satisfied. Therefore, the method 300 continues at steps 318, 324, and 326.

At step 318, the controller 100 determines if the system 10 is currently in a low NOx mode based on information from steps 312, 314, 316, and 330. At step 312, the controller receives information regarding current operating conditions of the engine 20 and the aftertreatment system 22, and this information is analyzed at step 314 to provide more advanced information regarding operating conditions. For example, as discussed above with regard to the low mode circuit 160, the operating condition data may indicate that the SCR catalyst 50 temperature is at an operating temperature. At step 316, the controller 100 receives information regarding whether the engine 20 is in a low fueling mode. The, based on an analysis of this information in step 318, if the controller 100 determines that the system 10 is not in a low NOx mode, the controller 100 proceeds to step 320. If the controller determines that the system 10 is operating in a low NOx mode, the controller 100 proceeds to step 322 and confirms that the low NOx mode persists by determining that the conditions underlying a low NOx mode continue for at least a pre-determined period of time. If the conditions persist, then the prerequisite at step 322 is satisfied.

At step 324, the controller 100 determines if present conditions indicate that the SCR system 52 has a low conversion efficiency based on information from steps 312, 314, and 320. For example, as discussed above with regard to the high mode circuit 162, the information from steps 312 and 314 may indicate that transient deNOx is poor, which would indicate that conditions are present for low SCR system 52 efficiency. At step 326, the controller 100 determines if present conditions indicate that the SCR system 52 is experiencing high ammonia slip based on information from steps 312, 314, and 320. This determination at step 326 may be a determination of an amount of ammonia slip or a determination that conditions are present for ammonia slip. For example, as discussed above with regard to the high mode circuit 162, the information from steps 312 and 314 may indicate that a rate of temperature change for the SCR catalyst 50 bed is high, which would indicate that conditions are present for ammonia slip. Then, at step 328, the controller 100 determines that the system 10 is in a high NOx mode if the result from either step 324 or step 326 is yes (i.e., either the SCR system 52 has a low conversion efficiency or high ammonia slip). If the system 10 is not in a high NOx mode, the method 300 proceeds to step 330. If the controller determines that the system 10 is operating in a high NOx mode, the controller 100 proceeds to step 332 and confirms that the high NOx mode persists by determining that the conditions underlying a high NOx mode continue for at least a pre-determined period of time. If the conditions persist, then the prerequisite at step 332 is satisfied.

Once both steps 322 and 332 are satisfied, the controller 100 proceeds to step 310 and determines a difference between the minimum value of step 306 and the maximum value of step 308. Then, at decision 334, the difference is compared to a diagnostic threshold. If the difference is greater than the diagnostic threshold (334: YES), the method 300 proceeds to step 336 and the controller declines to set or clears a system-out NOx sensor alert. If the difference is less than the diagnostic threshold (334: NO), the method proceeds to step 338 and the controller sets the system-out NOx sensor alert. Then, the controller 100 provides a notification of the malfunctioning system-out NOx sensor 17 at step 340 and diverts responsibility over determining an amount and timing of DEF dosing to the engine-out NOx sensor 16 at step 342.

The system-out NOx sensor alert, as such, is an indication that a NOx sensor (particularly the system-out NOx sensor) is 'stuck' or malfunctioning. In some embodiments, the system-out NOx sensor alert is or includes a fault code, an indicator lamp, a notification broadcast to a remote attendant, or an error message on the dashboard of the vehicle. Further, the system-out NOx sensor alert may trigger a related response, such as diverting responsibility over determining the amount and timing of DEF dosing to the engine-out NOx sensor 16.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples). Additionally, any element disclosed in one embodiment may be incorporated or utilized with any other embodiment disclosed herein.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 100 may include any number of circuits for completing the functions described herein. For example, the activities and functionalities of the low mode circuit 160, the high mode circuit 162, the sampling circuit 164, the threshold circuit 166, and the stuck circuit 168 may be combined in multiple circuits or as a single circuit. Additional circuits with additional functionality may also be included. Further, the controller 100 may further control other activity beyond the scope of the present disclosure.

As mentioned above and in one configuration, the "circuits" may be implemented in machine-readable medium for execution by various types of processors, such as the processor 112 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a computer or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A system, comprising:
   a controller comprising at least one processor coupled to a memory storing instructions that, when executed by the at least one processor, causes the controller to perform operations comprising:
   receive data indicative of operating conditions of at least one of an engine or of an aftertreatment system;
   determine, during a first period of time, that an amount of NOx output from the aftertreatment system satisfies a low NOx operating mode condition based on an analysis of the data indicative of the operating conditions;
   determine, during a second period of time, that operating conditions for ammonia slip are present based on the data indicative of the operating conditions of the aftertreatment system;
   responsive to the determination that operating conditions for the ammonia slip are present, determine that the amount of NOx output from the aftertreatment system satisfies a high NOx operating mode condition;
   retrieve a minimum value of the amount of NOx output from the aftertreatment system during the first period of time;
   retrieve a maximum value of the amount of NOx output from the aftertreatment system during the second period of time;
   compare a difference between the minimum value and the maximum value to a diagnostic threshold; and
   responsive to the difference being less than the diagnostic threshold, set an alert.

2. The system of claim 1, wherein the data indicative of the operating conditions of the aftertreatment system includes a rate of change of a temperature of an SCR catalyst in the aftertreatment system or an amount of ammonia storage in the aftertreatment system.

3. The system of claim 1, wherein the determination that the amount of NOx output from the aftertreatment system satisfies the low NOx operating mode condition comprises at least one of a determination that a fueling level of the engine is below a fueling threshold value, a determination that a temperature of a selective catalytic reduction (SCR) catalyst in the aftertreatment system is at or above a temperature threshold value, or a determination that an amount of the ammonia slip is below an ammonia threshold value.

4. The system of claim 1, wherein retrieving the minimum value during the first period of time is in response to the first period of time exceeding a time threshold value.

5. The system of claim 1, wherein the determination that operating conditions for the ammonia slip are present comprises at least one of a determination of an amount of the ammonia slip or a determination that a conversion efficiency of a selective catalytic reduction (SCR) catalyst in the aftertreatment system is below an efficiency threshold value.

6. The system of claim 1, wherein retrieving the maximum value during the second period of time is in response to the second period of time exceeding a time threshold value.

7. The system of claim 1, further responsive to the difference being less than the diagnostic threshold, alter DEF dosing from a closed feedback loop utilizing both a system-out exhaust gas sensor and an engine-out exhaust gas sensor to an open feedback loop utilizing the engine-out exhaust gas sensor.

8. A method for diagnosing a NOx sensor, comprising:
receiving data indicative of operating conditions of at least one of an engine or of an aftertreatment system;
determining, during a first period of time, that an amount of NOx output from the aftertreatment system satisfies a low NOx operating mode condition based on the data indicative of operating conditions;
determining, during a second period of time, that operating conditions for ammonia slip are present based on the data indicative of the operating conditions of the aftertreatment system;
responsive to the determination that operating conditions for the ammonia slip are present, determining that the amount of NOx output from the aftertreatment system satisfies a high NOx operating mode condition;
retrieving a minimum value of the amount of NOx output from the aftertreatment system during the first period of time;
retrieving a maximum value of the amount of NOx output from the aftertreatment system during the second period of time;
comparing a difference between the minimum value and the maximum value to a diagnostic threshold; and
responsive to the difference being less than the diagnostic threshold, setting an alert regarding the NOx sensor.

9. The method of claim 8, wherein the data indicative of the operating conditions of the aftertreatment system includes a rate of change of a temperature of an SCR catalyst in the aftertreatment system or an amount of ammonia storage in the aftertreatment system.

10. The method of claim 8, wherein determining that the amount of NOx output from the aftertreatment system satisfies the low NOx operating mode condition comprises at least one of determining that a fueling level of the engine is below a fueling threshold value, determining that a temperature of a selective catalytic reduction (SCR) catalyst in the aftertreatment system is at or above a temperature threshold value, or determining that an amount of ammonia slip is below an ammonia threshold value.

11. The method of claim 8, wherein retrieving the minimum value during the first period of time is in response to the first period of time exceeding a time threshold value.

12. The method of claim 8, wherein determining that operating conditions for the ammonia slip are present comprises at least one of determining of an amount of the ammonia slip or determining that a conversion efficiency of a selective catalytic reduction (SCR) catalyst in the aftertreatment system is below an efficiency threshold value.

13. The method of claim 8, wherein retrieving the maximum value during the second period of time is in response to the second period of time exceeding a time threshold value.

14. The method of claim 8, further responsive to the difference being less than the diagnostic threshold, altering DEF dosing from a closed feedback loop utilizing both a system-out exhaust gas sensor and an engine-out exhaust gas sensor to an open feedback loop utilizing the engine-out exhaust gas sensor.

15. A system, comprising:
an aftertreatment system in exhaust gas-receiving communication with an engine; and
a controller coupled to the aftertreatment system and the engine, the controller configured to:
receive data indicative of an operating condition of at least one of the engine or of the aftertreatment system;
determine, during a first period of time, that an amount of NOx output from the aftertreatment system satisfies a low NOx operating mode condition based on the data indicative of the operating conditions;
determine, during a second period of time, that operating conditions for ammonia slip are present based on the data indicative of the operating conditions of the aftertreatment system;
responsive to the determination that operating conditions for the ammonia slip are present, determine that the amount of NOx output from the aftertreatment system satisfies a high NOx operating mode condition;
retrieve a minimum value of the amount of NOx output from the aftertreatment system during the first period of time;
retrieve a maximum value of the amount of NOx output from the aftertreatment system during the second period of time;
compare a difference between the minimum value and the maximum value to a diagnostic threshold; and
responsive to the difference being less than the diagnostic threshold, set an alert.

16. The system of claim 15, wherein the determination that the amount of NOx output from the aftertreatment system satisfies the low NOx operating mode condition comprises at least one of a determination that a fueling level of the engine is below a fueling threshold value, a determination that a temperature of a selective catalytic reduction (SCR) catalyst in the aftertreatment system is at or above a temperature threshold value, or a determination that an amount of the ammonia slip is below an ammonia threshold value.

17. The system of claim 15, wherein retrieving the minimum value during the first period of time is in response to the first period of time exceeding a time threshold value.

18. The system of claim 15, wherein the determination that operating conditions for the ammonia slip are present comprises at least one of a determination of an amount of the ammonia slip or a determination that a conversion efficiency of a selective catalytic reduction (SCR) catalyst in the aftertreatment system is below an efficiency threshold value.

19. The system of claim 15, wherein retrieving the maximum value during the second period of time is in response to the second period of time exceeding a time threshold value.

20. The system of claim 15, further responsive to the difference being less than the diagnostic threshold, alter DEF dosing from a closed feedback loop utilizing both a system-out exhaust gas sensor and an engine-out exhaust gas sensor to an open feedback loop utilizing the engine-out exhaust gas sensor.

* * * * *